(12) United States Patent
Cohen

(10) Patent No.: US 10,182,535 B2
(45) Date of Patent: Jan. 22, 2019

(54) MESH BASED IRRIGATION SYSTEM

(71) Applicant: Amir Cohen, Yuvalim (IL)

(72) Inventor: Amir Cohen, Yuvalim (IL)

( * ) Notice: Subject to any disclaimer, the term of this patent is extended or adjusted under 35 U.S.C. 154(b) by 0 days.

(21) Appl. No.: 15/547,530

(22) PCT Filed: Jan. 5, 2017

(86) PCT No.: PCT/IL2017/050012
§ 371 (c)(1),
(2) Date: Jul. 31, 2017

(87) PCT Pub. No.: WO2017/118978
PCT Pub. Date: Jul. 13, 2017

(65) Prior Publication Data
US 2018/0014479 A1 Jan. 18, 2018

Related U.S. Application Data

(60) Provisional application No. 62/274,847, filed on Jan. 5, 2016.

(51) Int. Cl.
*A01G 25/06* (2006.01)
*B29C 65/00* (2006.01)
(Continued)

(52) U.S. Cl.
CPC .......... *A01G 25/06* (2013.01); *B29C 66/4322* (2013.01); *E02F 5/10* (2013.01);
(Continued)

(58) Field of Classification Search
CPC ..................................................... A01G 25/06
(Continued)

(56) References Cited

U.S. PATENT DOCUMENTS 3,408,818 A 11/1968 Hemphill
3,739,523 A 6/1973 Tuffli
(Continued)

FOREIGN PATENT DOCUMENTS

DE 26 10 384 * 9/1976 ............. A01G 25/06
FR 2304281 10/1976
(Continued)

OTHER PUBLICATIONS

International Search Report and the Written Opinion dated Apr. 21, 2017 From the International Searching Authority Re. Application No. PCT/IL2017/050012. (16 Pages).
(Continued)

*Primary Examiner* — Frederick L Lagman

(57) ABSTRACT

According to some embodiments of the present invention, there are provided a flowing water channel device, comprising, a tubular conduit made of fluid impervious material and at least one slit extending along a longitudinal axis of the tubular conduit, a first and a second marginal edge of the tubular conduit are opposing to one another, and at least one fluid permeable sheet material layer passing via the at least one slit and having a first marginal portion spread within the tubular conduit along the longitudinal axis and a second marginal portion spread outside of the tubular conduit along the longitudinal axis.

11 Claims, 13 Drawing Sheets

(51) Int. Cl.
*E02F 5/10* (2006.01)
*B29C 65/08* (2006.01)
*B29C 65/18* (2006.01)
*B29C 65/38* (2006.01)
*B29C 65/48* (2006.01)
*B29L 31/00* (2006.01)
*F16L 1/032* (2006.01)

(52) U.S. Cl.
CPC .............. *B29C 65/08* (2013.01); *B29C 65/18* (2013.01); *B29C 65/38* (2013.01); *B29C 65/48* (2013.01); *B29K 2995/0068* (2013.01); *B29L 2031/70* (2013.01); *F16L 1/032* (2013.01)

(58) Field of Classification Search
USPC ................ 405/43, 44, 45, 47, 48, 50; 47/81
See application file for complete search history.

(56) References Cited

U.S. PATENT DOCUMENTS

| | | | |
|---|---|---|---|
| 4,247,051 A | 1/1981 | Allport | |
| 4,930,934 A * | 6/1990 | Adkins | A01G 25/06 137/601.18 |
| 4,948,295 A * | 8/1990 | Pramsoler | A01G 25/06 239/542 |
| 5,443,544 A | 8/1995 | Azoulay | |
| 5,816,742 A * | 10/1998 | Cordewener | A01G 25/023 405/43 |
| 5,839,659 A | 11/1998 | Murray | |
| 5,938,372 A | 8/1999 | Lichfield | |
| 7,681,356 B2 | 3/2010 | Sheldrake et al. | |
| 8,491,223 B2 | 7/2013 | Ohlin | |
| 2010/0284744 A1* | 11/2010 | Ohlin | A01G 25/06 405/49 |
| 2012/0230767 A1 | 9/2012 | DesGarennes et al. | |
| 2015/0050087 A1 | 2/2015 | Gould et al. | |
| 2015/0319943 A1* | 11/2015 | Leslie | A01G 25/06 47/48.5 |

FOREIGN PATENT DOCUMENTS

| | | | | |
|---|---|---|---|---|
| FR | 2323317 A1 * | 4/1977 | ............ | A01G 25/06 |
| WO | WO-9103155 A1 * | 3/1991 | ............ | A01G 25/06 |
| WO | WO 2017/118978 | 7/2017 | | |

OTHER PUBLICATIONS

International Preliminary Report on Patentability dated Jul. 19, 2018 From the International Bureau of WIPO Re. Application No. PCT/IL2017/050012. (10 Pages).

* cited by examiner

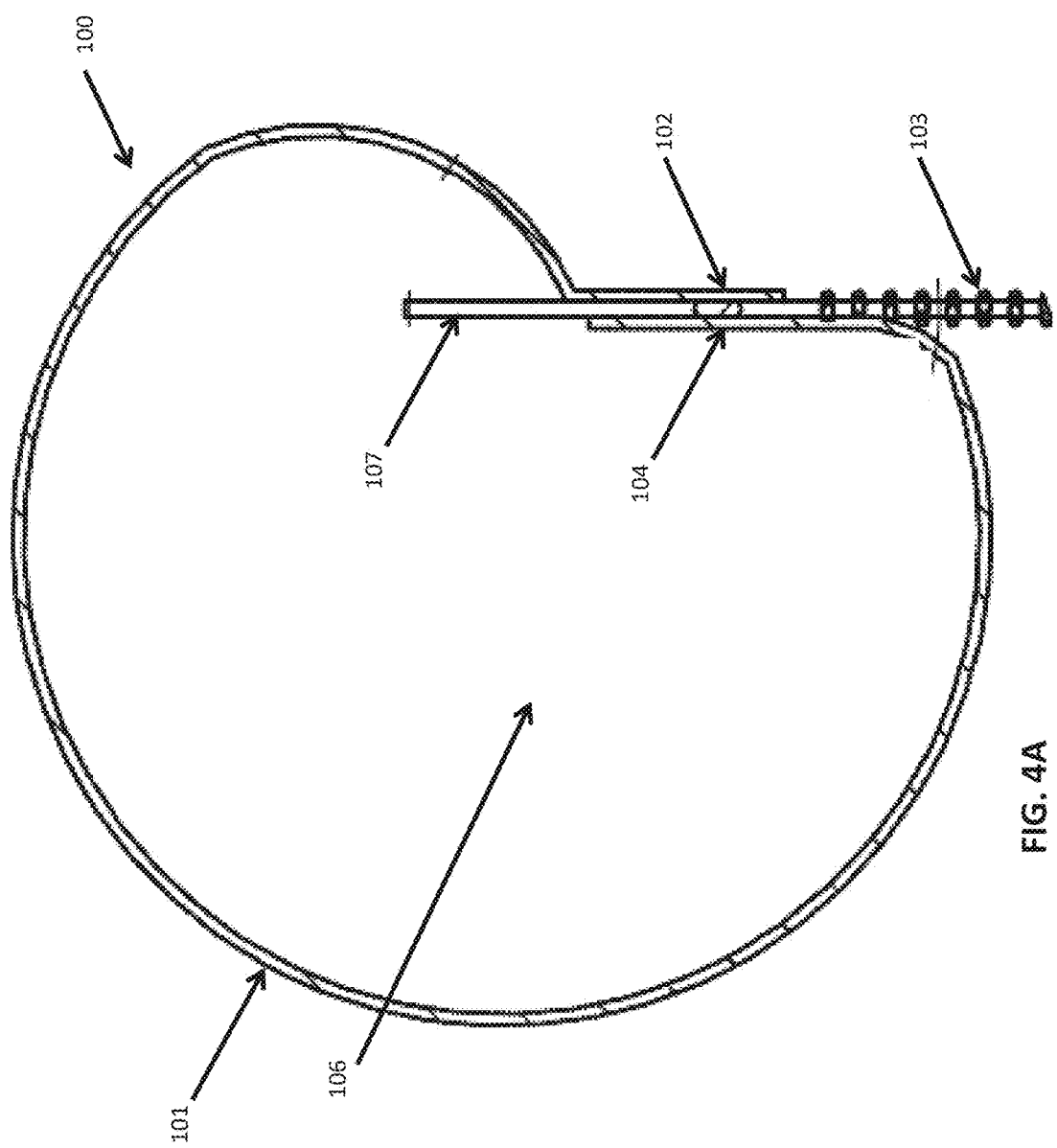

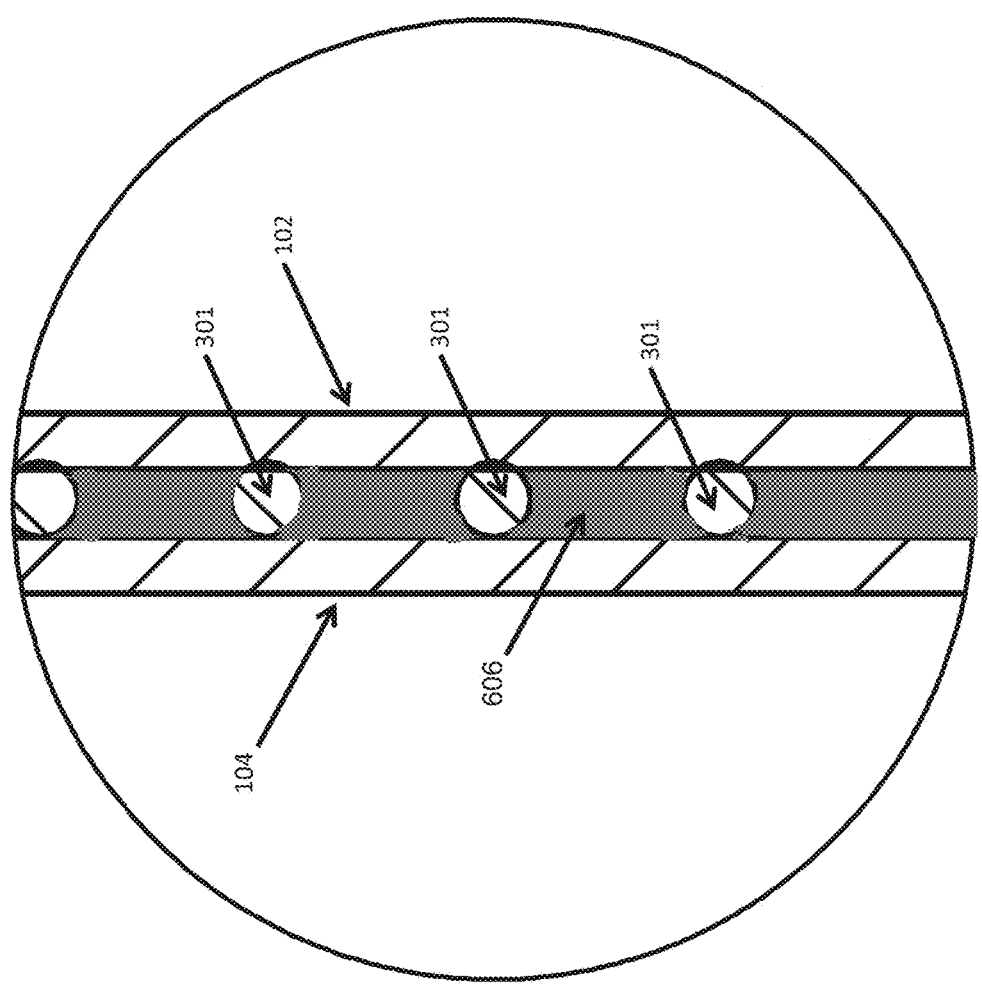

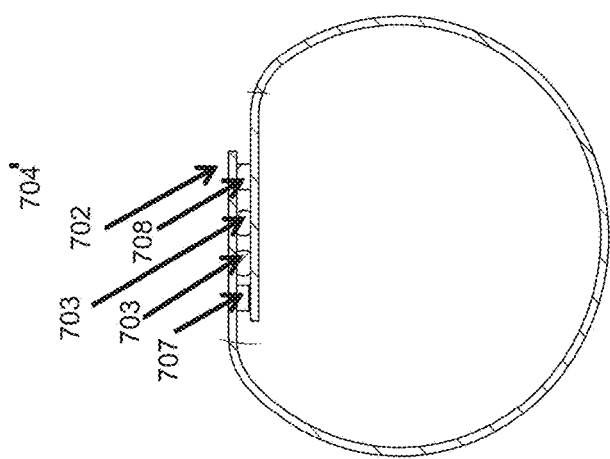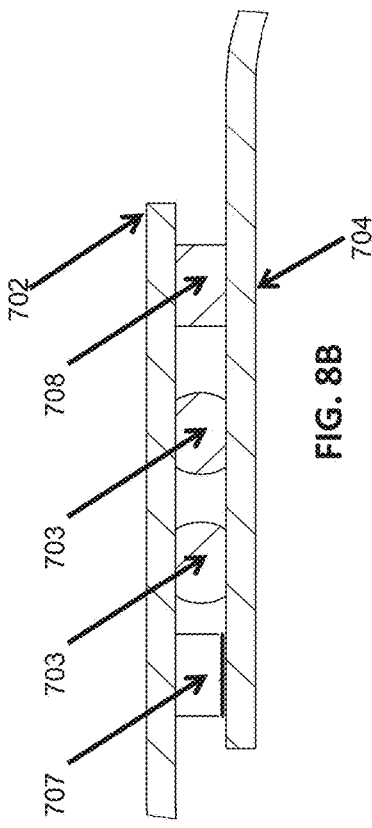

MESH BASED IRRIGATION SYSTEM

RELATED APPLICATIONS

This application is a National Phase of PCT Patent Application No. PCT/IL2017/050012 having International filing date of Jan. 5, 2017, which claims the benefit of priority under 35 USC § 119 (e) of U.S. Provisional Patent Application No. 62/274,847 filed on Jan. 5, 2016. The contents of the above applications are all incorporated by reference as if fully set forth herein in their entirety.

BACKGROUND

The present invention, in some embodiments thereof, relates to irrigation with uniform fluid distribution under low fluid pressure and, more specifically, but not exclusively, to a device that employs molecular forces to distribute water from a conduit to the soil.

Current irrigation technology, for example drip irrigation, greatly reduces wastage of water, both through reduced evaporation and concentrating location of irrigation to areas that are accessible to the target plants. A limitation of drip technology is that it requires relatively high pressure, typically 2-3 standard atmospheres (ATM). In addition, due fluid dynamics, the pressure in a drip irrigation pipe will be reduced as a result of each drip outlet. As a result the amount of water distributed at a given point is reduced proportional to the number of drip outlets between the point and the pressure source.

Given the limitations mentioned above, drip irrigation has limited application in areas that lack water source with sufficient pressure, and/or lack economic means to artificially the increase pressure of supplied water. Many areas in the underdeveloped world are therefore not able to gain the efficiency benefits of drip irrigation. In the developed world, where commercial farming may require irrigation pipes hundreds of meters long, uniform distribution of water along the length of a field requires complicated logistics due to loss of pressure over the length of a drip system.

SUMMARY

According to some embodiments of the present invention there are provided a flowing water channel device, comprising, a tubular conduit made of fluid impervious material and at least one slit extending along a longitudinal axis of the tubular conduit, a first and a second marginal edge of the tubular conduit are opposing to one another, and at least one fluid permeable sheet material layer passing via the at least one slit and having a first marginal portion spread within the tubular conduit along the longitudinal axis and a second marginal portion spread outside of the tubular conduit along the longitudinal axis.

Optionally, the at least one fluid permeable sheet material comprises material fluid may flow though the material solely by force of capillary action, cohesion, adhesion, and/or other molecular forces.

Optionally, the at least one fluid permeable sheet material comprising a weave of a plurality of strands, such that a fluid may flow though the strands by force of capillary action, cohesion, adhesion, and/or other molecular forces.

Optionally, the at least one fluid permeable sheet material is made of at least one material of a member of a group consisting of, super absorbent polymer (SAP), sodium polyacrylate, and/or cotton.

Optionally, the first and second marginal edges overlap along at least ⅛ radian of an arc of a cross section of the tubular conduit, the overlap comprising a boundary of the slit.

Optionally, a seal material positioned along the at least one slit.

Optionally, the first and second marginal edges are bonded to one another in a welding process.

According to some embodiments of the present invention, there are provided a method for manufacturing a tubular conduit comprising curving a longitudinal foil made of a fluid impervious material along a longitudinal axis thereof such that a first and a second marginal edge of the longitudinal foil are overlapping and a longitudinal void encircled by the longitudinal foil is formed along the longitudinal axis, and mounting a fluid permeable sheet material layer to pass via a slit formed between the first and second marginal edges such that a first marginal portion of the permeable sheet spreads within the longitudinal void along the longitudinal axis and a second marginal portion of the permeable sheet spreads outside of the tubular conduit along the longitudinal axis.

Optionally, deposit at least one bonding substance between the first and the second marginal edges along the longitudinal axis, the bonding substance impervious to fluids.

Optionally, bonding the first and second marginal edges of the longitudinal foil by simultaneously pressing the bonding substance and the first and second marginal edges, and the bonding substance forms a water impermeable barrier between the first and second marginal edges and surrounding the fluid permeable sheet.

Optionally, at least one bonding substance comprising a member of a group consisting of adhesive material, welding material, a double sided tape, a silicone layer, a heat sealing material, and impulse sealing material.

Optionally, the slit is sealed by a heat sealing device along the longitudinal axis, comprising one or more of a plurality of heat sealing devices selected from a group consisting of heat bar sealers, continuous heat sealers, impulse heat sealers, and/or ultra-sonic welding.

According to some embodiments of the present invention, there are provided a flowing water channel device, comprising a tubular conduit made of fluid impervious material and at least one aperture along a longitudinal axis of the tubular conduit, at least one fluid permeable material layer that expands when contacted by water spread longitudinally along the at least one apertures, and a first and a second marginal edge of the tubular conduit opposing to one another and overlapping.

Optionally, the at least one aperture comprises a slit extending along the longitudinal axis.

Optionally, the at least one aperture comprises a plurality of apertures along the longitudinal axis and positioned along the overlap.

Optionally, the permeable material may be a comprised of one or more members of a group comprising polyurethane, Ellastolan 1385A, and any other fluid permeable material that expands when contacted by water.

Optionally, a force of capillary action is sufficient to cause fluids to flow through the permeable material.

Optionally, a first and a second marginal edge of the tubular conduit overlap along at least ⅛ radian of an arc of a cross section of the tubular conduit, the overlap comprising a boundary of the slit.

Optionally, at least one first obstruction line is positioned longitudinally along the slit comprising a sequence of segments for blocking access from the central cavity to an exterior of the tubular conduit alternating with segments not blocking the access.

Optionally, at least one second obstruction line is positioned longitudinally along the slit comprising a sequence of segments for blocking access from the central cavity to an exterior of the tubular conduit alternating with segments not blocking the access, comprising an area of access greater than the area of access in the first obstruction line.

Optionally, when the at least one aperture comprises the plurality of apertures, the at least one second obstruction line is positioned longitudinally along the slit fully blocking access from the central volume to an exterior of the tubular conduit.

Optionally, 7, the permeable material is positioned between the first obstruction line and the second obstruction line, the second obstruction line is positioned adjacent to the central cavity.

Optionally, the permeable material when in contact with water expands in volume such that a portion of the permeable material protrudes to an exterior of the tubular conduit, and a portion of the permeable material protrudes into the tubular conduit.

Optionally, the slit is sealed by a heat sealing device along the longitudinal axis, comprising one or more of a plurality of heat sealing devices selected from a group consisting of heat bar sealers, continuous heat sealers, impulse heat sealers, and/or ultra-sonic welding.

According to some embodiments of the present invention, there are provided a method for manufacturing a tubular conduit, comprising, curving a longitudinal foil made of a fluid impervious material along a longitudinal axis thereof such that a first marginal edge of the longitudinal foil and a second marginal edge of the longitudinal foil are overlapping and a central void encircled by the longitudinal foil is formed along a longitudinal axis, and mounting a fluid permeable material layer that expands when contacted by water within a slit formed between the first and the second marginal edges.

Optionally, at least one first obstruction line and at least one second obstruction line mounted longitudinally along the overlap, the first obstruction line is mounted adjacent to the central void, and the fluid permeable material mounted between the first and the second obstruction lines.

Optionally, the at least one first obstruction line comprising segments along the longitudinal axis blocking access from the central cavity to an exterior of the tubular conduit alternating with segments not blocking the access.

Optionally, the at least one second obstruction line comprising segments along the longitudinal axis blocking access from the central void to an exterior of the tubular conduit alternating with segments not blocking the access, the first obstruction line comprises a greater amount of blocked access than the second obstruction line.

Optionally, a plurality of apertures along the longitudinal axis, the plurality of apertures located along the overlap, the at least one second obstruction line fully blocking access from the central void to an exterior of the tubular conduit.

Optionally, spreading at least one bonding substance between the first and the second marginal edges along the longitudinal axis.

Optionally, bonding the first and second marginal edges of the longitudinal foil by simultaneously pressing the bonding substance and the first and second marginal edges.

Optionally, the at least one bonding substance comprises a member of a group consisting of adhesive material, welding material, a double sided tape, a silicone layer, a heat sealing material, and impulse sealing material.

Optionally, the slit is sealed by a heat sealing device along the longitudinal axis, comprising one or more of a plurality of heat sealing devices selected from a group consisting of heat bar sealers, continuous heat sealers, impulse heat sealers, and/or ultra-sonic welding.

According to some embodiments of the present invention, there are provided a method of implanting a longitudinal tubular conduit in soil comprising, the tubular conduit comprising a sheet layer material protruding from a slit along a longitudinal axis of the tubular conduit, and/or a fluid permeable material positioned within the slit and protruding from the slit when contacted with water, furrowing a soil along a longitudinal axis of ground for creating a furrow, positioning the tubular conduit in and along the furrow, the tubular conduit formed to dispense fluids to the soil solely by force of soil suction and gravity, and covering the tubular conduit with soil displaced by the furrow.

Optionally, adding a different soil having a property of uniform porosity into the furrow, positioning the tubular conduit on the uniformly porous soil, and covering the tubular conduit with a layer of the uniformly porous soil.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIG. 4A is a cross section view of an exemplary tubular conduit, according to some embodiments of the present invention;

FIG. 4B is a cross section view of a slit in an exemplary tubular conduit, according to some embodiments of the present invention;

FIG. 8A is a cross section view of an exemplary tubular conduit, according to some embodiments of the present invention;

FIG. 8B is a magnified cross section view of an exemplary slit, according to some embodiments of the present invention.

DETAILED DESCRIPTION

Figure 1A:
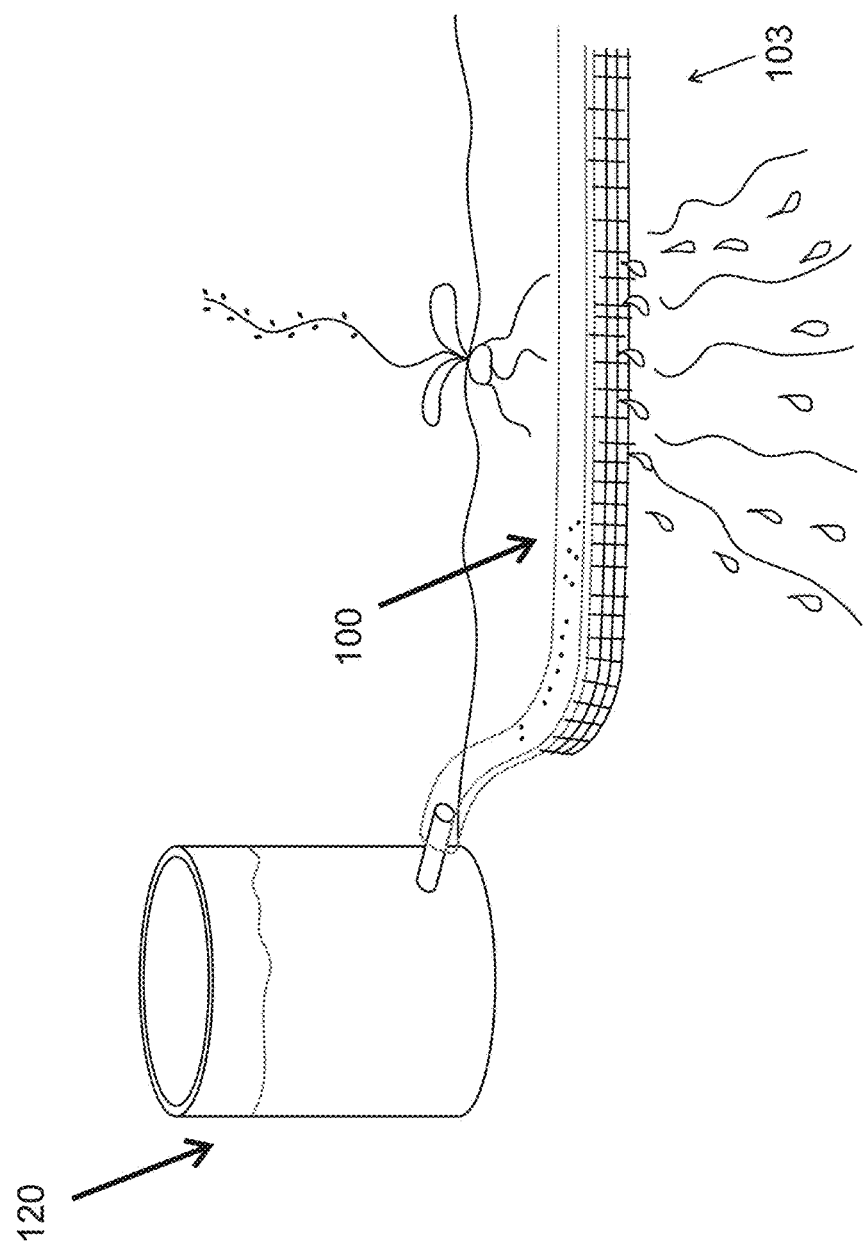
FIG. 1A is a simplified illustration of a tubular conduit with a fluid permeable sheet and a reservoir filled with a fluid, in accordance with an embodiment of the present invention.

The present invention, in some embodiments thereof, relates to irrigation with uniform fluid distribution under low fluid pressure and, more specifically, but not exclusively, to a device that employs molecular forces to distribute water from a conduit to the soil.

Irrigation of agricultural fields requires apparatus that both efficiently distributes water to target zones with minimal evaporation or wastage, and uniformly distributes the water over large areas. The existing systems of drip irrigation provide a solution to both of these requirements; however, drip irrigation requires relatively high pressure, up to 3 ATM, to operate over large areas. In addition, the water pressure in a drip irrigation pipe is reduced by every drip outlet, such that to maintain uniform distribution of water, water pressure usually must be regulated at distant points along an irrigation pipe.

In many areas of the developing world, water pressure available for small farms is not sufficient for drip irrigation. The alternative to drip irrigation, sprinkler systems are inefficient due to loss of water to evaporation.

The devices and methods, in some embodiments thereof, relates to irrigation using an irrigation pipe with a permeable sheet material layer such as a cloth or other material having one edge positioned within the irrigation pipe and the other end outside the irrigation pipe. The irrigation pipe and permeable sheet material layer may be buried in soil such that when water flows through the pipe, the permeable sheet material layer is moistened and transfers water from the irrigation pipe to the soil. The molecular forces of water, for example capillary action, are sufficient to withdraw the water from the pipe through the permeable sheet material layer and into the soil. Since capillary action is not influenced by a length of a pipe, fluid may be distributed in a uniform manner along the length of the pipe regardless or with limited effect of the pressure gradient along the irrigation pipe.

In some embodiments of the current invention, a foam material that expands when contacted with fluid such as water is positioned in located in a passage between the inner volume of the of an irrigation pipe and one or more apertures on the surface of the irrigation pipe, for instance in a slit located along the irrigation pipe. The irrigation pipe may be buried in soil such that when water flows through the irrigation pipe the foam material expands and protrudes from the slit to be in contact with the soil. Molecular forces, for example capillary action, are sufficient to withdraw fluid from the irrigation pipe through the foam material and into the soil.

In some embodiments of the current invention, the irrigation pipe described above is manufactured by curving a water impervious foil into a longitudinal tube with an overlap of edges forming a slit. The permeable sheet material layer or the expanding foam passes via the slit. Gaps in the slit may be is sealed so that the only possible flow of water via is either the permeable sheet material layer or the expanding foam.

An advantage of the present invention, in some embodiments, comprises little or no loss of fluid due to evaporation. The irrigation pipe is buried within soil, such that exposure of the fluid to air is much less than in drip irrigation or sprinkler system.

Another advantage of the present invention, in some embodiments, comprises uniform distribution of water along a length of an irrigation pipe. As stated above, the force used to withdraw water from the irrigation pipe is not affected by the length of the irrigation pipe, allowing uniform distribution along a length of an irrigation pipe.

Another advantage of the present invention, in some embodiments, comprises little or no requirement for fluid pressure to withdraw fluid from the irrigation pipe. As explained above, the force used to withdraw fluids from the irrigation pipe are molecular forces, for example capillary action, such that pressure does not need to be applied to the fluid to force the fluid to exit the irrigation pipe.

As explained above, in some embodiments of the present invention molecular forces are utilized to distribute water. Molecular forces of water are the mechanism that plants utilize to draw water from soil into roots, and to raise water against the force of gravity from the roots up into the plant or tree body and leaves. The current invention, in some embodiments thereof, utilizes molecular forces of water to draw water from a conduit into surrounding soil without application of pressure or other outside forces. The property of soil to attract water is referred to as soil suction.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference is now made to FIG. 1A, a simplified illustration of a tubular conduit 100 with a fluid permeable sheet 103 and a reservoir 120 filled with a fluid, in accordance with an embodiment of the present invention. As described above, the fluid is conveyed from a permeable sheet 103 to a soil by force of soil suction without a pressurized fluid delivery system.

Figure 1B:
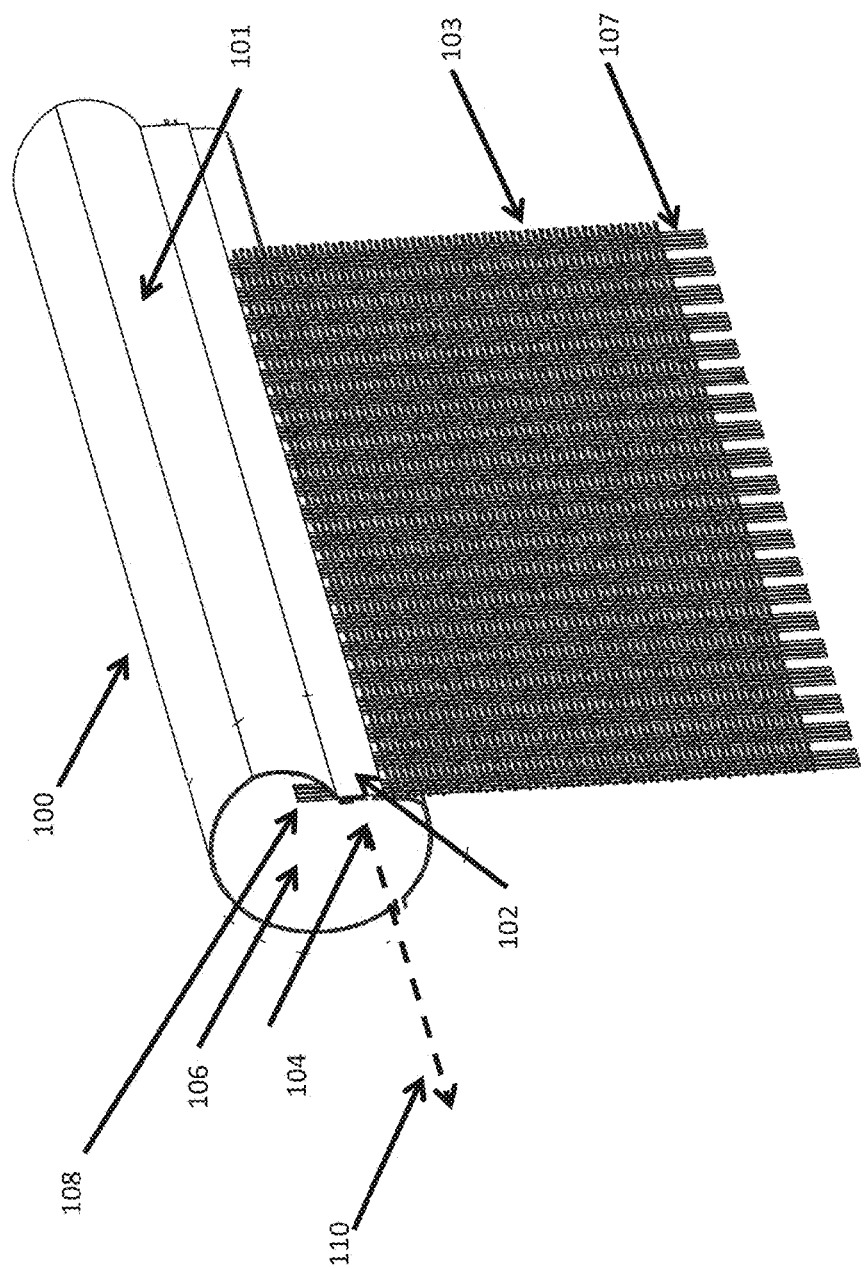
FIG. 1B is a simplified isomeric view of a water channel device with a fluid permeable sheet, in accordance with an embodiment of the present invention.

Reference is now made to FIG. 1B, a simplified isometric view of tubular conduit 100 with a fluid permeable sheet, referred to herein as a sheet 103, in accordance with an embodiment of the present invention. Tubular conduit 100 has a diameter of between 5 and 50 millimeters, and comprises a fluid impervious material, referred to herein as material 101, wherein a first marginal edge 102 and a second marginal edge 104 of material 101 overlap. In some embodiments of the present invention, the overlap forms an aperture along the longitudinal axis 110, referred to herein as slit 105.

As shown in FIG. 1B, sheet 103 has a first marginal portion 107 located within tubular conduit 100, and a second marginal portion 108 outside tubular conduit 100.

Figure 2:
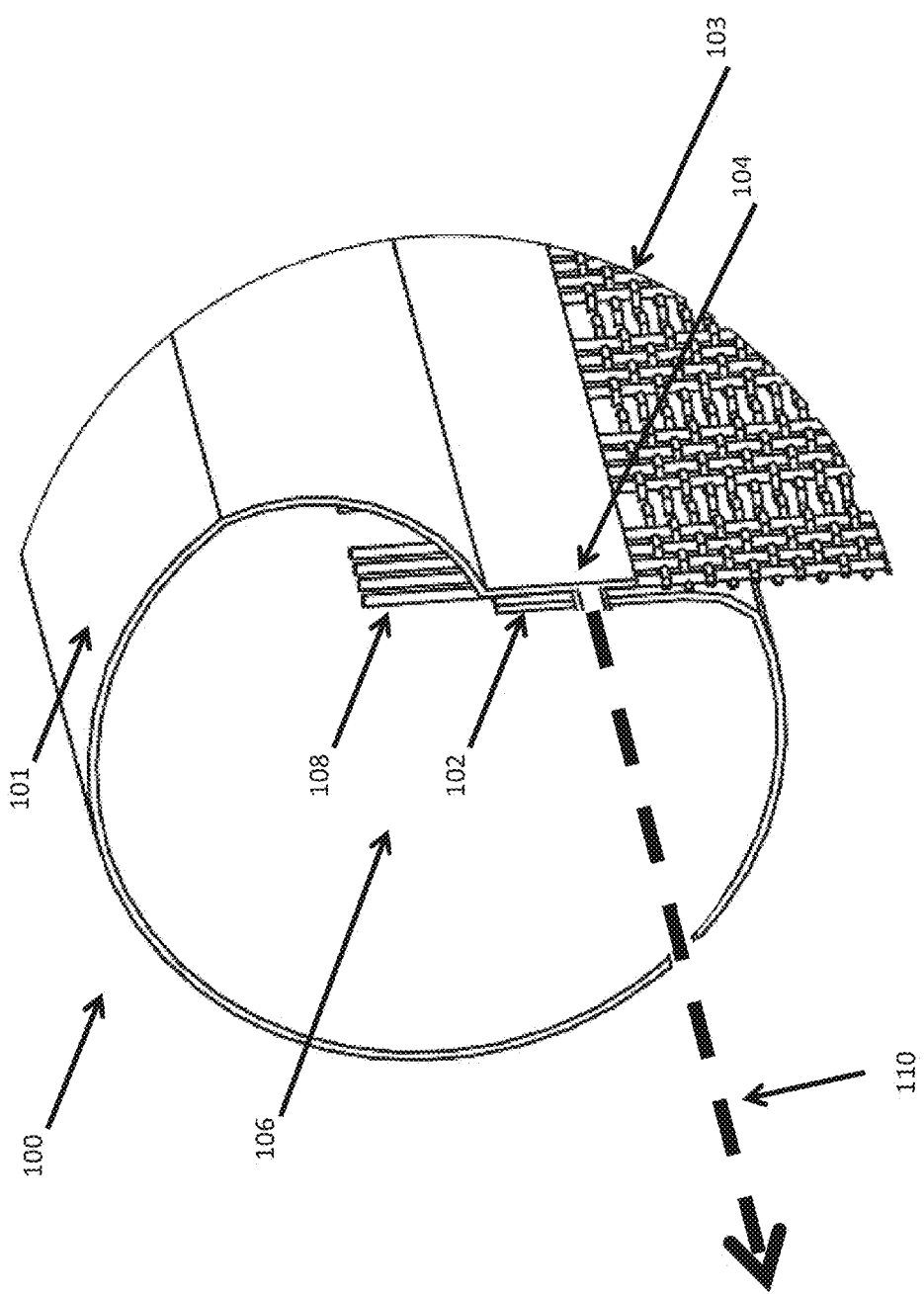
FIG. 2 is a cross section view of an exemplary tubular conduit, according to some embodiments of the present invention.

Reference is now made to FIG. 2, a cross section view of an exemplary tubular conduit, according to some embodiments of the present invention. An area of overlap between first edge 102 and second edge 104 forms slit 105 along longitudinal axis 110. A segment of sheet 103 is located within slit 105 along longitudinal axis 110.

Tubular conduit 100 allows water and/or any other viscous fluid, referred to herein as fluid, to flow through a central volume 106. As the fluid fills the central volume 106, first marginal portion 107 of sheet 103 is moistened. As described below, molecular forces of fluids cause the fluid to moisten sheet 103, and when sheet 103 is wet and in contact with soil, molecular forces draw the fluid into the soil from the sheet.

Soil comprises many small grains with air between them. The force of soil suction manifests in empty spaces between the grains of soil. The molecular force of adhesion, the attraction of a fluid to other materials, applies a force on fluids to adhere to proximal surfaces, for example grains of soil. The molecular force of cohesion, the attraction of a fluid to itself, prevents a drop from detaching as fluid adheres to other substances, causing a continuous flow of fluid.

The present invention, in some embodiments thereof, uses the force of soil suction to distribute a fluid from a tubular conduit to a soil.

When tubular conduit 100 is filled with a fluid and sheet 103 is in contact with soil, for example when tubular conduit 100 is buried in soil, soil suction draws fluid from the sheet into the soil.

Optionally, sheet 103 comprises a material that in the absence of other forces, the forces of adhesion and cohesion are sufficient to cause a fluid to flow through sheet 103.

Figure 3:
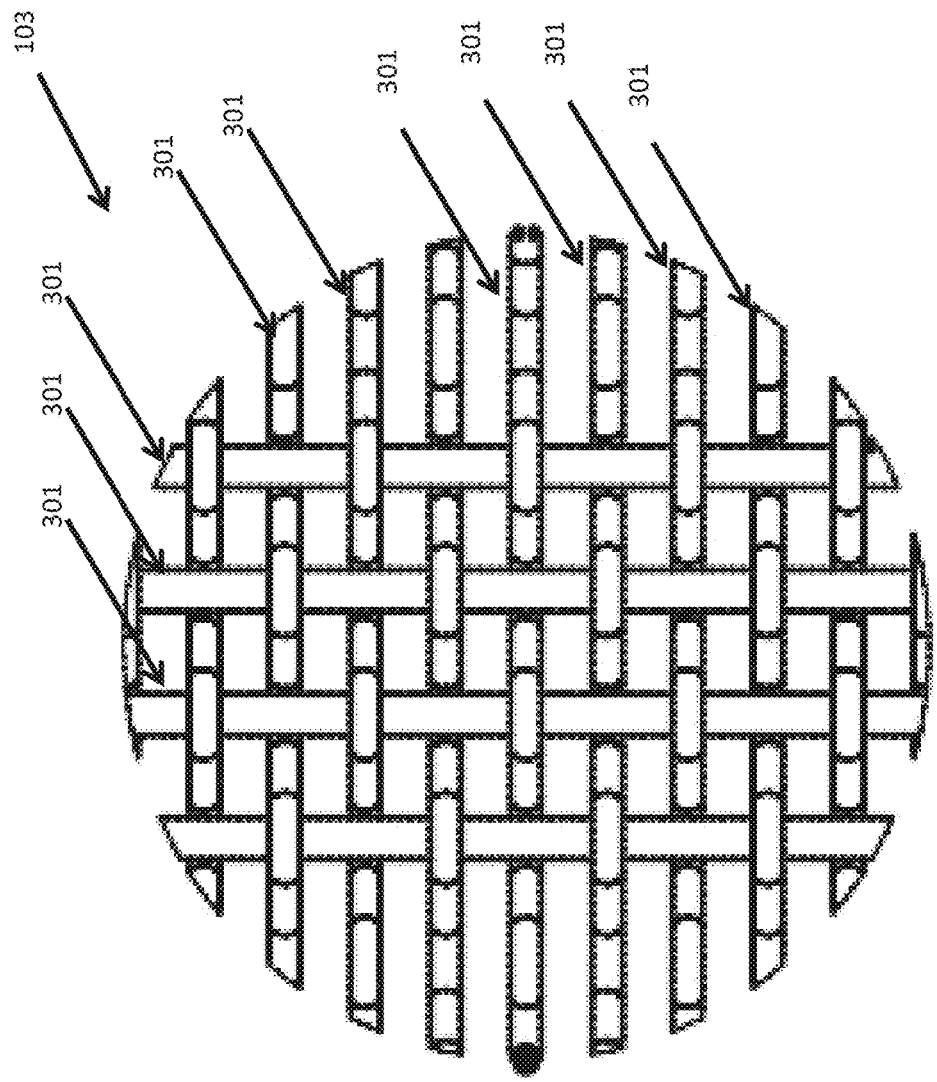
FIG. 3 is a magnified view of an exemplary sheet woven from numerous strands, according to some embodiments of the present invention.

Reference is now made to FIG. 3, a magnified view of exemplary sheet 103 woven from numerous strands 301, according to some embodiments of the present invention. Optionally, sheet 103 is woven of strands 301 that have a physical property that the forces of adhesion and cohesion are sufficient to cause a fluid to flow within strand 301 in the absence of other forces.

Optionally, sheet 103 comprises super absorbent polymer (SAP), sodium polyacrylate, and/or cotton.

Reference is now made to FIG. 4A, a cross section view of an exemplary tubular conduit 100, according to some embodiments of the present invention. As described above, tubular conduit 100 comprises an overlap of first marginal edge 102 and second marginal edge 104. Optionally, the amount of overlap is at least ⅛ of a radian of an arc of a cross section of tubular conduit 100.

Reference is now made to FIG. 4B, a cross section view of a slit 105 in an exemplary tubular conduit 100, according to some embodiments of the present invention. In exemplary FIG. 4B sheet 103 is woven from stands 301. As seen in FIG. 4B, strands 301 are located within slit 105 between first marginal edge 102 and second marginal edge 104.

Optionally, bonding substance 606 seals a gap between first marginal edge 102 and sheet 103, and seals a gap between second marginal edge 104 and sheet 103. Optionally, the bonding material prevents a fluid from flowing around sheet 103 via slit 105 to the exterior of tubular conduit 100. Optionally, when sheet 103 comprises a weave of strands, the bonding material enters the spaces between the strands and prevents fluid from flowing between woven strands 301. Optionally, the bonding material may be an adhesive, a welding material, a double sided tape, a heat sealing material, and/or an impulse welding material. Optionally, the bonding material is impervious to flow of fluid. Optionally, first edge 107 and second edge 108 are heat welded to one another.

Figure 5:
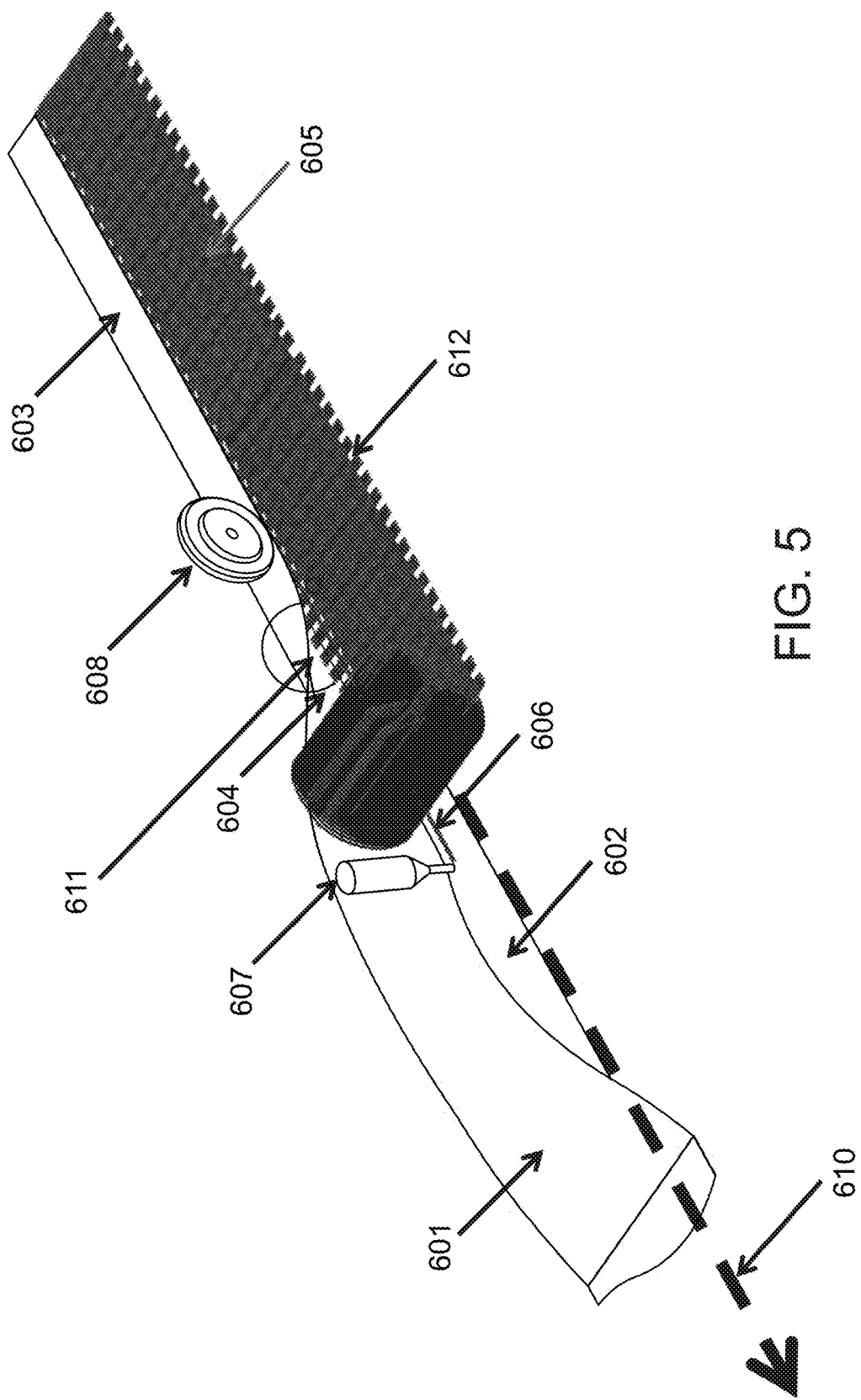
FIG. 5 is an illustration of an exemplary process for manufacturing a tubular conduit, according to some embodiments of the present invention.

Reference is now made to FIG. 5, an illustration of an exemplary process for manufacturing a tubular conduit, according to some embodiments of the present invention. As shown in FIG. 5, a longitudinal foil, referred to herein as a foil 601, comprises a fluid impervious material. Foil 601 is curved to overlap first marginal edge 602 and a second marginal edge 603 of foil 601 along a longitudinal axis 610, forming slit 604. Curved foil 601 encircles a central volume 609 within tubular conduit 601. A fluid conducting sheet, referred to herein as sheet 605, is positioned between first marginal edge 602 and second marginal edge 603 along longitudinal axis 610. A first marginal portion 611 of sheet 605 is located within tubular conduit 601, and a second marginal portion of sheet 605 is located outside tubular conduit 601.

Optionally, as shown in FIG. 5, at least one bonding substance 606 is deposited by an extruder 607 onto first marginal edge 602 within slit 605 along longitudinal axis 610. Optionally, first marginal edge 602 and second marginal edge 603 are pressed towards each along longitudinal axis 610 when sheet 605 and bonding substance 606 are between first marginal edge 602 and second marginal edge 603. Optionally, pressure wheel 608 applies pressure to second marginal edge 603, wherein the pressure is resisted by a surface under first marginal edge 602.

Optionally, bonding substance 606 may be an adhesive material, a welding material, a double sided tape, a heat sealing material, and/or an impulse sealing material.

Optionally, slit 605 is sealed by a heat sealing device along longitudinal axis 610, causing first marginal edge 602 and second marginal edge 603 to be heat welded together, with sheet 605 within slit 604.

Figure 6:
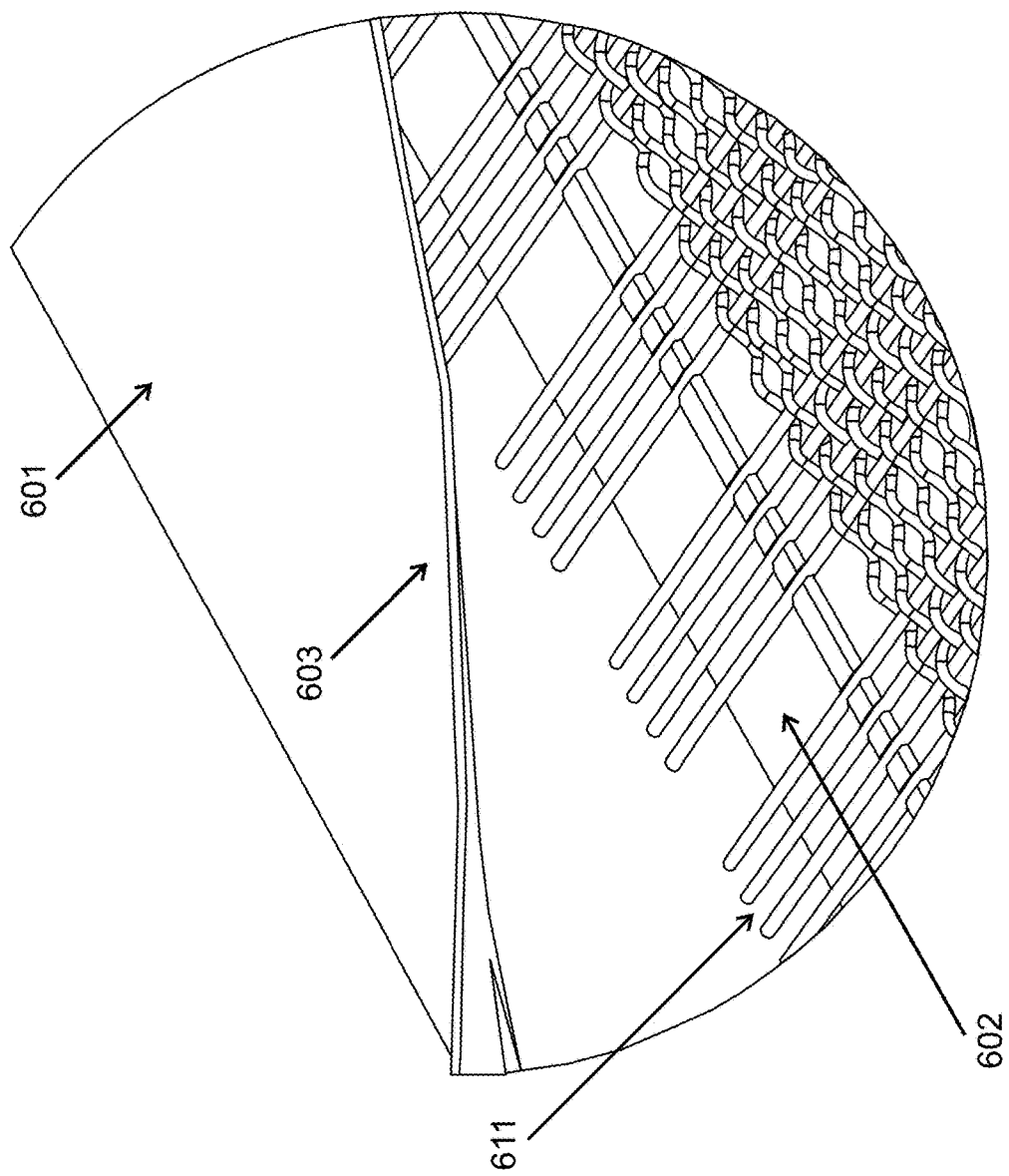
FIG. 6 is an illustration of an exemplary overlap of a foil in a process for manufacturing a tubular conduit, according to some embodiments of the present invention.

Reference is now made to FIG. 6, an illustration of an overlap in an exemplary process for manufacturing a tubular conduit, according to some embodiments of the present invention. As shown in FIG. 6 foil 601 is curved to overlap first marginal edge 602 and second marginal edge 603. First marginal portion 611 is positioned on first marginal edge 602.

Figure 7A:
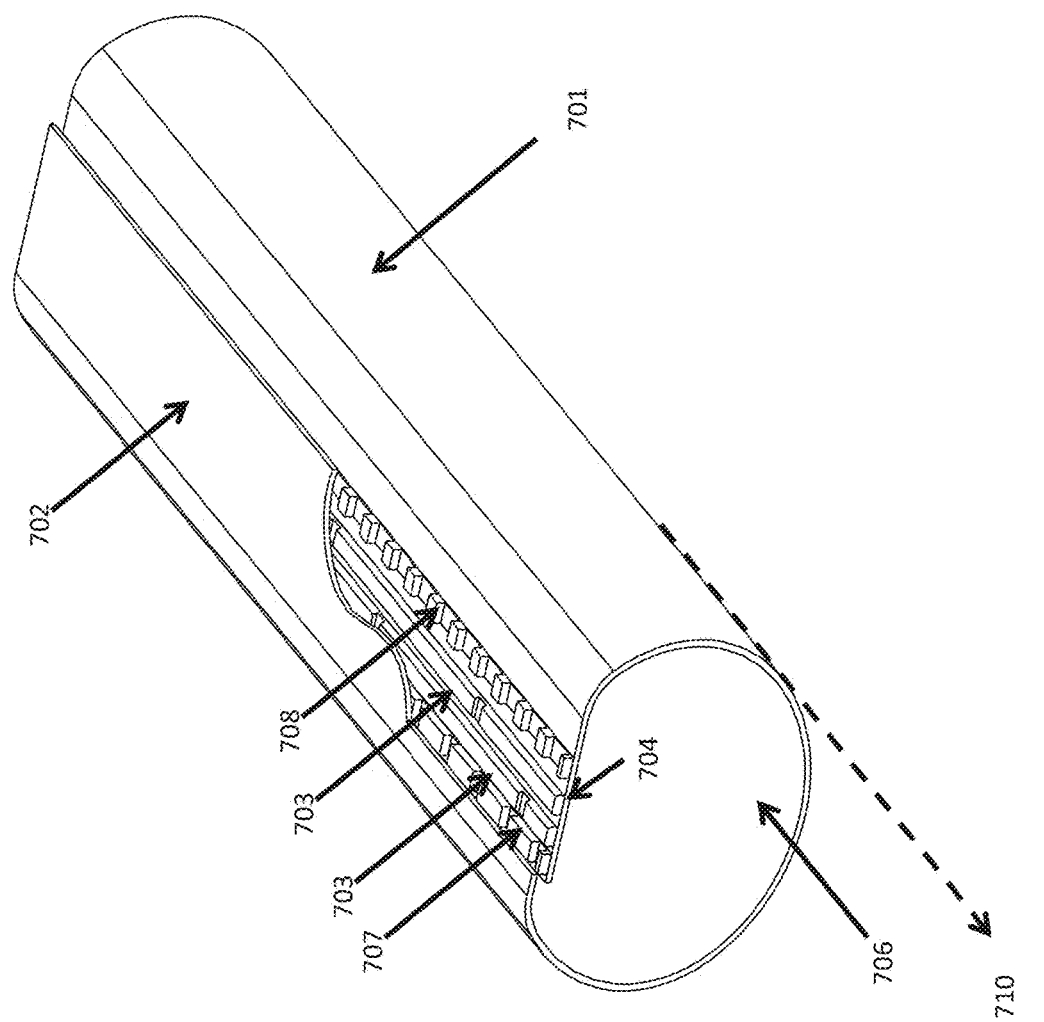
FIG. 7A is a simplified isometric cut away view of a tubular conduit with a fluid permeable material that expands when in contacted by water, in accordance with an embodiment of the present invention.

Reference is now made to FIG. 7A, a simplified isometric cut away view of a tubular conduit 700 with a fluid permeable material that expands when in contacted by water, referred to herein as expanding material 703, in accordance with an embodiment of the present invention. Tubular conduit 700 comprises a fluid impervious material 701, referred to herein as material 701, wherein a first marginal edge 702 and a second marginal edge 704 of material 701 overlap, forming slit 705 along longitudinal axis 710. Central volume 706 is formed by material 701.

Tubular conduit 700 is a device to distribute water to soil via expanding material 703. As seen in FIG. 7A within slit 705 along longitudinal axis 710 there is at least one deposit of expanding material 703, and at least two lines of obstructions.

When a fluid flows through central volume 706, expanding material 703 is moistened and expands via slit 705 to the exterior of tubular conduit 700. When tubular conduit 700 is buried in a soil, molecular forces of adhesion and cohesion cause the soil to draw fluid from expanding material 703.

As shown in FIG. 7A, expanding material 703 is located longitudinally between first obstruction line 707 and second obstruction line 708, where first obstruction line 707 is adjacent to central volume 705 along horizontal axis 710. Expanding material 703 expands equally in all directions when contacted by fluid. As described below, first obstruction line 707 and second obstruction line 708 allow a greater portion of expanding material 703 to expand outside tubular conduit 700 than to expand into central volume 706. When tubular conduit 700 is buried in soil, an amount of fluid drawn into a soil is proportional to a surface area of contact between expanding material 703 and a soil.

First obstruction line 707 comprises segments that alternately block or allow access to the exterior of tubular conduit 700 from the slit 705.

Second obstruction line 708 comprises segments that alternately block or allow access to the central volume 706 from the slit 705.

Along longitudinal axis 710, second obstruction line 708 has a greater area that allows access than first obstruction line 707. When expanding material expands from contact by a fluid, the greater access area of second obstruction line 708 allows a greater portion of the expansion towards the exterior of tubular conduit 700 than towards central volume 706.

Figure 7C:
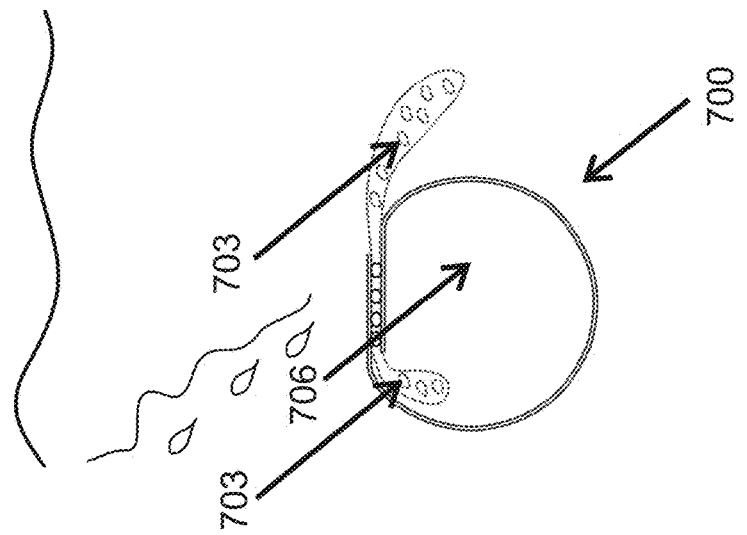
FIG. 7C is a simplified cross sectional view of tubular conduit as seen in FIG. 7B, in accordance with an embodiment of the present invention.
Figure 7B:
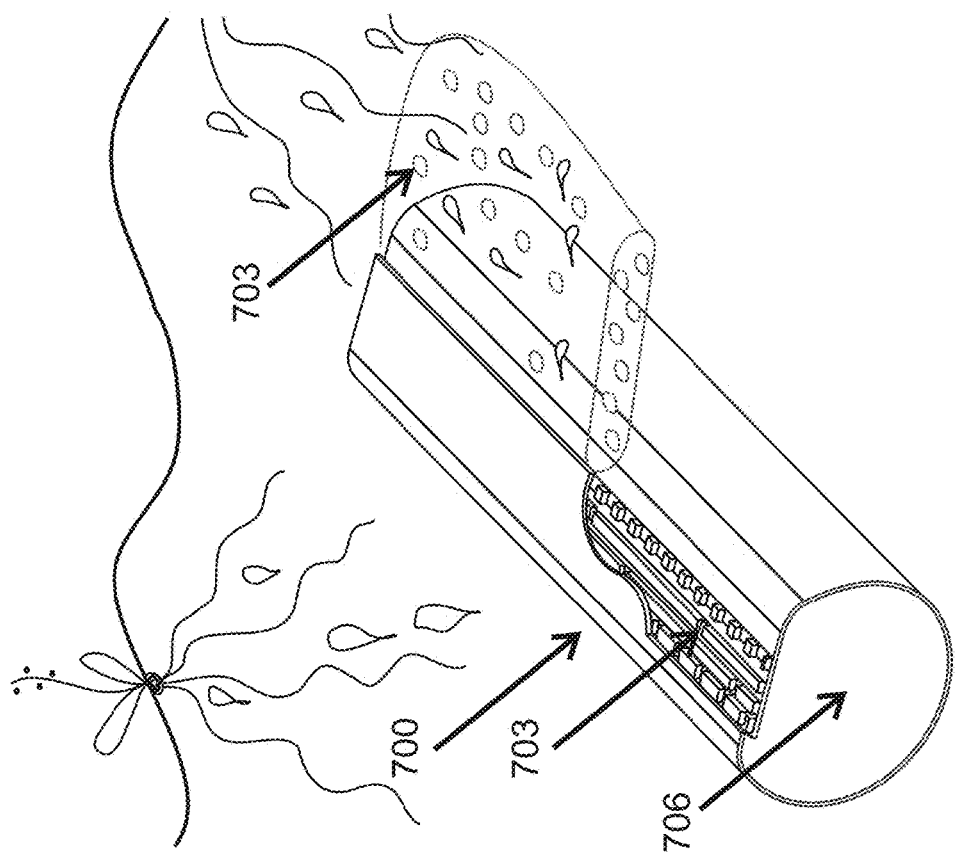
FIG. 7B is a simplified illustration of a tubular conduit with an expanding material buried in a soil, in accordance with an embodiment of the present invention.

Reference is now made to FIG. 7B, a simplified illustration of a tubular conduit 700 with an expanding material 703 buried in a soil. As seen in FIG. 7B, expanding material 703 has been contacted by a fluid and is expanded into the surrounding soil.

Reference is now made to FIG. 7C, a simplified cross sectional view of tubular conduit 700 as seen in FIG. 7B. As seen in FIG. 7C, expanding material 703 has expanded both into central volume 706 and to the exterior of tubular conduit 701.

Figure 7D:
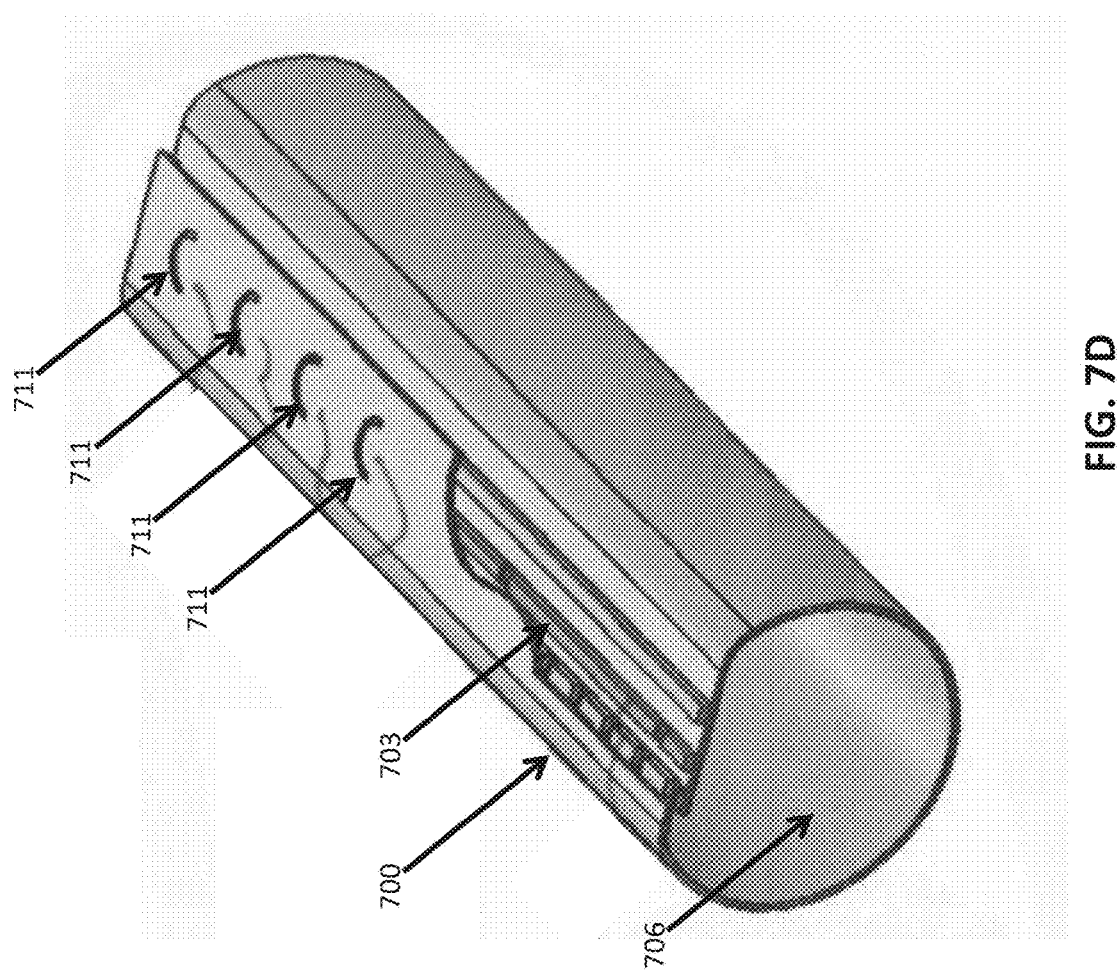
FIG. 7D is a simplified isometric cut away view of a tubular conduit with a plurality of apertures, according to some embodiments of the present invention.

Reference is now made to FIG. 7D, an exemplary tubular conduit with one or more apertures 711, according to some embodiments of the present invention. Optionally, apertures 711 are located along the overlap of first marginal edge 702 and second marginal edge 704. Optionally, in the embodiment comprising the plurality of apertures, second obstruction line 708 fully blocks access to central volume 706, such that expanding material 703 expands via plurality of apertures 711 to the exterior of tubular conduit 700 when contacted by water.

Reference is now made to FIG. 8A, a cross section view of an exemplary tubular conduit 700, according to some embodiments of the present invention. As described above, tubular conduit 700 comprises slit 705 formed by the overlap of first edge marginal 102 and second marginal edge 104. Optionally, the amount of overlap is at least ⅛ of a radian of an arc of a cross section of tubular conduit 700. The overlap comprises a border of slit 705 along longitudinal axis 710.

Optionally, expanding material 703 comprises a material that in the absence of other forces, the forces of adhesion and cohesion are sufficient to cause a fluid to flow through material 703.

Optionally, expanding material 703 comprises a polyurethane, Ellaston 1385A, and/or any other fluid permeable material that expands when contacted by fluid and/or water.

Reference is now made to FIG. 8B, a magnified cross section view of an exemplary slit 705, according to some embodiments of the present invention. Slit 705 is bounded by first marginal edge 702 and second marginal edge 704. Within slit 705 is at least one line of expanding material 703, first obstruction line 707, and second obstruction line 708.

Optionally, slit 705 is sealed with a bonding material. Optionally, the bonding material adheres to first marginal edge 107 and/or second marginal edge 108 and/or first obstruction line 107 and/or second obstruction 1 line 108. Optionally, the bonding material may be an adhesive, a welding material, a double sided tape, a heat sealing material, and/or an impulse welding material. Optionally, the bonding material is impervious to flow of fluid. Optionally, first edge 107 and second edge 108 are heat welded to one another.

A process for manufacture of tubular conduit with a fluid permeable material that expands when in contacted by water is now described, in accordance with some embodiments of the present invention. A longitudinal foil comprised of a fluid impervious material, referred to herein as a curved foil, is curved to overlap a first marginal edge and a second marginal edge along a longitudinal axis, forming a slit. The curved foil encircles a central volume within the tubular conduit. A fluid conducting material that expands when contacted by water, referred to herein as expanding material, is deposited between the first marginal edge and the second marginal edge along a longitudinal axis of the tubular conduit.

A first obstruction line and a second obstruction line, as described above, are positioned within the slit as described above. The first and second obstruction lines may be bonded to the first or second marginal edge with an adhesive, or by heat welding.

Optionally, at least one or more bonding substances is deposited by an extruder onto the first marginal edge within the slit along the longitudinal axis. Optionally, the first marginal edge and the second marginal edge are pressed towards each along the longitudinal axis when the one or more bonding substances are between the first marginal edge and the second marginal edge. Optionally, a pressure wheel applies pressure to the second marginal edge, wherein the pressure is resisted by a surface under the first marginal edge.

Optionally, the bonding substance may be an adhesive material, a welding material, a double sided tape, a heat sealing material, and/or an impulse sealing material.

Optionally, the slit is sealed by a heat sealing device along the longitudinal axis, causing the first marginal edge and the second marginal edge to be heat welded together.

Figure 9:
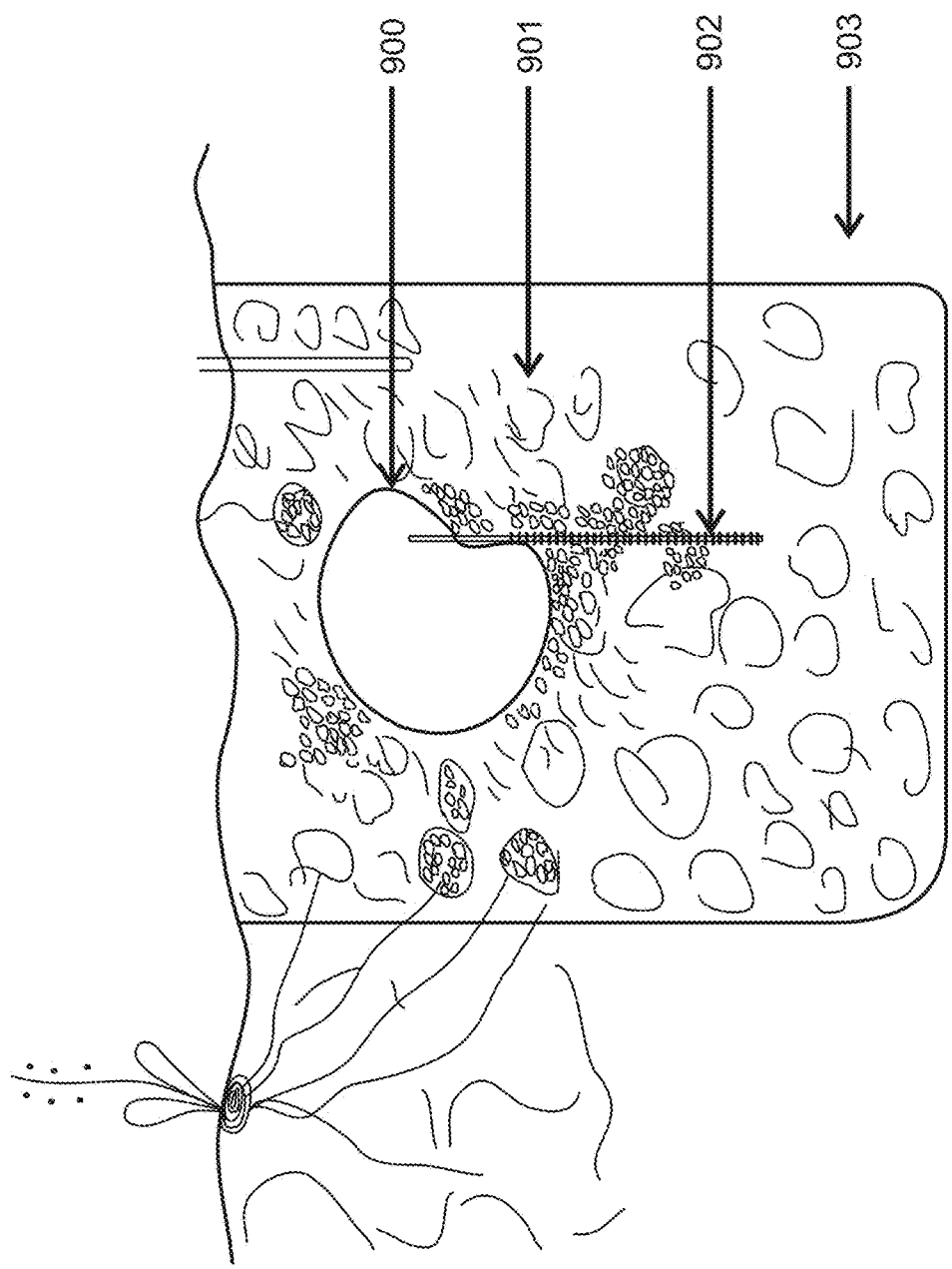
FIG. 9 is an exemplary illustration of a method for implanting a tubular conduit with a fluid permeable material, in accordance with some embodiments of the present invention.

Reference is now made to FIG. 9, an exemplary illustration of a method for implanting a tubular conduit with a fluid permeable material in a soil, in accordance with some embodiments of the present invention. As seen in FIG. 9, tubular conduit 900 is shown in a cross sectional view within a soil 901. A sheet material 902 protrudes from a longitudinal slit in tubular conduit 900. In another embodiment of the present invention, a fluid permeable material that expands when contacted by water is located within the slit in place of sheet material 902.

A furrow is dug in a soil along a longitudinal axis, and tubular conduit 900 is positioned in and along the furrow. Tubular conduit 900, when connected to a fluid source, may dispense fluids to the soil via the sheet material by force of soil suction. In another embodiment of the current invention, tubular conduit 900, when connected to a fluid source, may dispense fluids to the soil by force of soil suction via the fluid permeable material that expands when contacted by water. The furrow containing tubular conduit 900 is filled with soil displaced by the furrow.

As seen in FIG. 9, optionally, a different soil, 901, may be added to the furrow than the soil 903 displaced by the furrow. The different soil 901 may be uniformly porous. When different soil 901 is added to the furrow, the tubular conduit is positioned on top of a layer of soil 901, and an additional layer of different soil 901 is placed on top of the tubular conduit such that the furrow is filled.

A uniformly porous soil will exert a more uniform force of soil suction over the length of a furrow than soil which is not uniformly porous. The amount of fluid drawn from the tubular conduit is proportional to the force of soil suction, such that a uniformly porous soil along a longitudinal furrow draws a uniform amount of fluid along the longitudinal furrow.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is expected that during the life of a patent maturing from this application many relevant fluid permeable materials will be developed and the scope of the terms fluid permeable sheet and expanding material are intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A flowing water channel device, comprising:
   a tubular conduit made of fluid impervious material and at least one slit extending along a longitudinal axis of said tubular conduit;
   wherein a first and a second marginal edge of said tubular conduit are opposing to one another; and
   a first plurality of strands passing via said at least one slit;
   a second plurality of strands that are external to said tubular conduit and is interlaced with the first plurality of strands, wherein the first plurality of strands and the second plurality of strands form a fluid permeable sheet material layer that is external to the tubular conduit; and
   a bonding material spread along said longitudinal axis in a gap between said first marginal edge and said second marginal edge to seal spaces between the plurality of strands and prevent fluid from flowing between said plurality of strands.

2. The device of claim 1, wherein said at least one fluid permeable sheet material comprises material wherein fluid may flow though said material solely by force of capillary action, cohesion, adhesion, and/or other molecular forces.

3. The device of claim 1, wherein said at least one fluid permeable sheet material comprising a weave of a plurality of strands, such that a fluid may flow though said strands by force of capillary action, cohesion, adhesion, and/or other molecular forces.

4. The device of claim 1, wherein said at least one fluid permeable sheet material is made of at least one material of a member of a group consisting of: super absorbent polymer (SAP), sodium polyacrylate, and/or cotton.

5. The device of claim 1, wherein said first and second marginal edges overlap along at least ⅛ radian of an arc of a cross section of said tubular conduit, said overlap comprising a boundary of said slit.

6. The device of claim 1, further comprising a seal material positioned along said at least one slit.

7. The device of claim 1 wherein the first plurality of strands are parallel to each other.

8. A method for manufacturing a tubular conduit, comprising:
   curving a longitudinal foil made of a fluid impervious material along a longitudinal axis thereof such that a first and a second marginal edge of said longitudinal foil are overlapping and a longitudinal void encircled by said longitudinal foil is formed along said longitudinal axis; and
   mounting a first plurality of strands extending from a fluid permeable sheet material layer within a slit formed between said first and second marginal edges such that a first marginal portion of said first plurality of strands spreads within said longitudinal void along said longitudinal axis and a second marginal portion of said first plurality of strands spreads outside of said tubular conduit along said longitudinal axis, and wherein the second marginal portion of the first plurality of strands are interlaced with a second plurality of strands to form the fluid permeable sheet material layer; and
   spreading a bonding material along said longitudinal axis in a gap between said first marginal edge and said second marginal edge to seal spaces between the first plurality of strands and prevent fluid from flowing between said first plurality of strands.

9. The method of manufacturing of claim 8, wherein said bonding material surrounding said fluid permeable sheet.

10. The method of manufacturing of claim 8, wherein said bonding material comprising a member of a group consisting of adhesive material, welding material, a double sided tape, a silicone layer, a heat sealing material, and impulse sealing material.

11. The method of manufacturing of claim 8, wherein said slit is sealed by a heat sealing device along said longitudinal axis, comprising one or more of a plurality of heat sealing devices selected from a group consisting of heat bar sealers, continuous heat sealers, impulse heat sealers, and/or ultrasonic welding.

* * * * *

UNITED STATES PATENT AND TRADEMARK OFFICE
CERTIFICATE OF CORRECTION

PATENT NO. : 10,182,535 B2
APPLICATION NO. : 15/547530
DATED : January 22, 2019
INVENTOR(S) : Amir Cohen Page 1 of 1

It is certified that error appears in the above-identified patent and that said Letters Patent is hereby corrected as shown below:

In the Claims

Claim 2, Column 14 Line 6, delete "though" and insert --through--.

Claim 3, Column 14 Line 9, delete "comprising" and insert --comprises--.

Claim 3, Column 14 Line 10, delete "though" and insert --through--.

Claim 9, Column 14 Line 52, delete "surrounding" and insert --surrounds--.

Claim 10, Column 14 Line 55, delete "comprising" and insert --comprises--.

Signed and Sealed this
Fifth Day of January, 2021

Andrei Iancu
*Director of the United States Patent and Trademark Office*